United States Patent [19]
Nakagawa

[11] Patent Number: 6,019,426
[45] Date of Patent: Feb. 1, 2000

[54] CHILD SEAT

[75] Inventor: Osamu Nakagawa, Tokyo, Japan

[73] Assignee: Takata Corporation, Tokyo, Japan

[21] Appl. No.: 09/223,024

[22] Filed: Dec. 30, 1998

[30] Foreign Application Priority Data

Jan. 21, 1998 [JP] Japan ................ H10-009648

[51] Int. Cl.[7] .................... B60N 2/28
[52] U.S. Cl. ................ 297/256.11; 297/250.1
[58] Field of Search ............. 297/250.1, 256.11, 297/338, 236, 234, 344.15

[56] References Cited

U.S. PATENT DOCUMENTS

| | | | |
|---|---|---|---|
| 1,546,220 | 7/1925 | Eriksen | 297/338 |
| 1,853,848 | 4/1932 | Cross | 297/256.11 X |
| 2,743,766 | 5/1956 | Bartman | 297/338 |
| 3,222,106 | 12/1965 | Stout | 297/338 X |
| 5,031,960 | 7/1991 | Day | 297/256.11 X |
| 5,282,666 | 2/1994 | Demick et al. | 297/338 X |
| 5,788,326 | 8/1998 | Kawade et al. | |

FOREIGN PATENT DOCUMENTS

| | | |
|---|---|---|
| 0 816 160 | 4/1998 | European Pat. Off. . |
| 80 01070 | 9/1980 | France . |
| 4-35931 | 3/1992 | Japan . |

OTHER PUBLICATIONS

Patent Abstracts of Japan, vol. 097, No. 6, Jun. 30, 1997 & JP 09 030300 A (Honda Motor Co., Ltd.), Feb. 4, 1997.

*Primary Examiner*—Peter R. Brown
*Attorney, Agent, or Firm*—Kanesaka & Takeuchi

[57] ABSTRACT

A child seat is formed of a base; a seat body attached to the base and having a seat back; a seat plate disposed in the seat body; and a supporting mechanism for supporting the seat plate. The seat plate includes a front seat plate having a first engaging member, and a rear seat plate having a rear end slidably engaging a guide slit in the seat back and a second engaging member slidably engaging the first engaging member. The supporting mechanism includes a linkage situated between the base and the front seat plate to allow the front seat plate to move up and down. A stopping device is attached to the front seat plate to engage the seat body for stopping the front seat plate at a selected level relative to the base. When the seat plate is moved up and down, no unnecessary space is formed relative to the seat back.

6 Claims, 7 Drawing Sheets

CHILD SEAT

FIELD OF THE INVENTION

The present invention relates to a child seat for seating an infant therein and, more particularly, to a child seat to be put on a vehicle seat. In detail, the child seat to which the present invention relates is the child seat wherein a seat plate can be moved up and down.

DESCRIPTION OF PRIOR ART

A child seat used in a vehicle for seating an infant therein includes a seat plate is adjustable in its height according to the size of the infant's body. Disclosed in Japanese utility model application 4-35931A has a structure of supporting a seat plate such that the height of the seat plate can be adjusted by links.

In such a child seat which supports a seat plate such that the height of the seat plate is adjustable by links, a rear portion of the seat plate becomes closer to a seat back when the seat plate is risen, and the rear portion is spaced apart from the seat back when the seat plate is lowered. Therefore, there should be a large space between the rear portion of the seat plate and the seat back.

In JU 4-35931A, the seat back is provided with a concave portion formed in a lower portion into which a rear end of the seat plate enters to fill a space between the seat plate and the seat back. However, a seat cover is apt to be caught between the rear end of the seat plate and the concave portion when the seat plate is risen, so hindrance against the adjustment of the height of the seat plate is likely to occur.

OBJECT AND SUMMARY OF THE INVENTION

It is an object of the present invention to provide a child seat which dose not form a space between the seat plate and the seat back even when the seat plate is risen. It is another object of the present invention to provide a child seat which always allows smooth vertical adjustment of the seat plate.

A child seat of the present invention has a seat or seat section; a supporting mechanism for supporting the seat plate to allow the up-and-down movement of the seat plate; and a stopping means for stopping the seat plate at a desired level. The seat plate comprises a front seat plate and a rear seat plate, a rear portion of the front seat plate and and a front portion of the rear seat plate are slidably engaged with each other. A rear end portion of the rear seat plate is connected to the seat back such that the rear seat plate is slidable vertically.

In the child seat as mentioned above, since the rear seat plate is engaged with the seat back, a space between the seat plate and the seat back is never widened even when the seat plate moves up and down. A child seat cover is never caught between the rear seat plate and the seat back even when the seat plate is risen, so that the seat plate can be always smoothly risen.

DETAILED DESCRIPTION OF A PREFERRED EMBODIMENT

Figure 1:
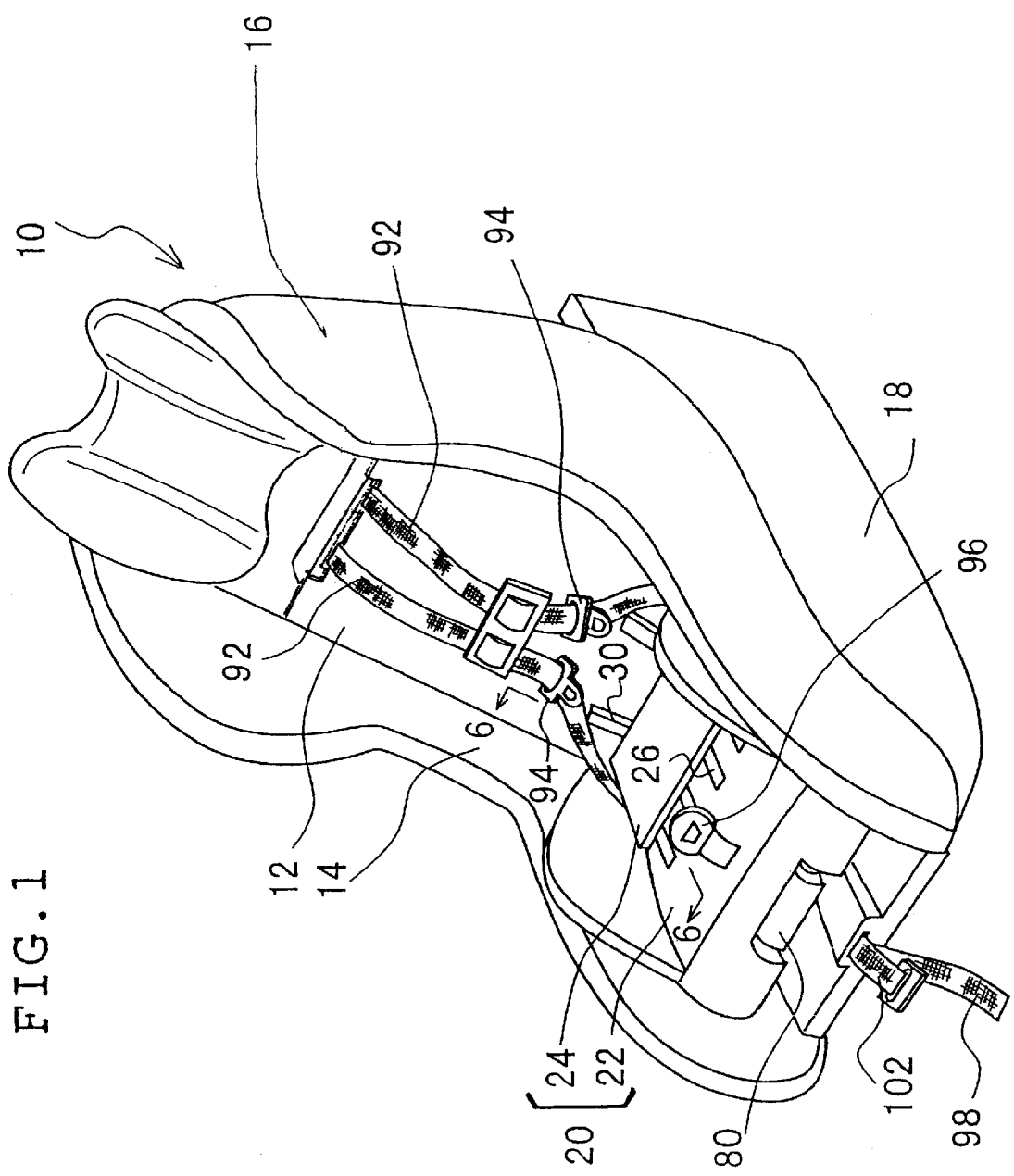
FIG. 1 is a perspective view of a child seat according to an embodiment.
Figure 2:
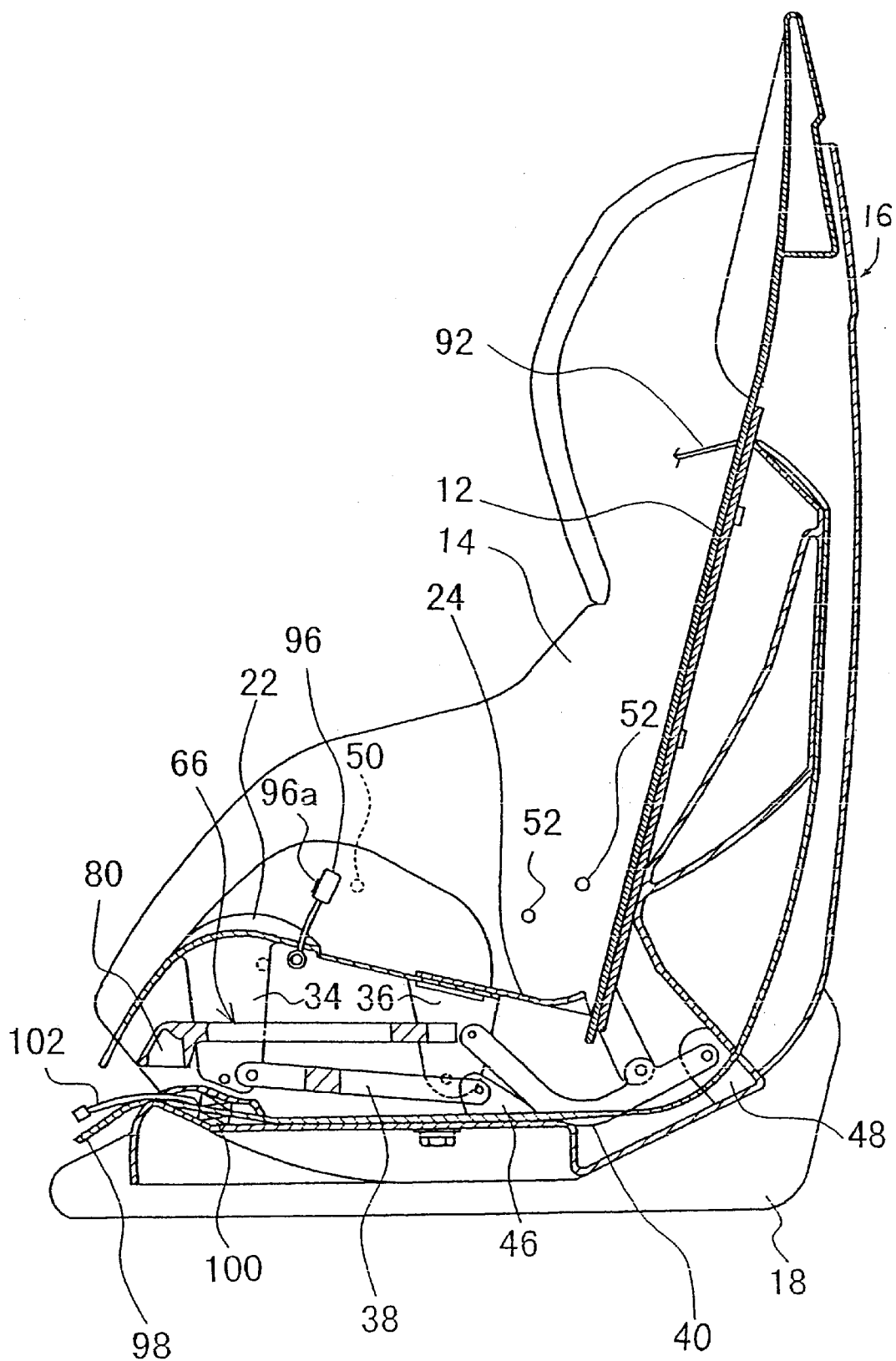
FIG. 2 is a vertical sectional view of the child seat of FIG. 1.
Figure 3:
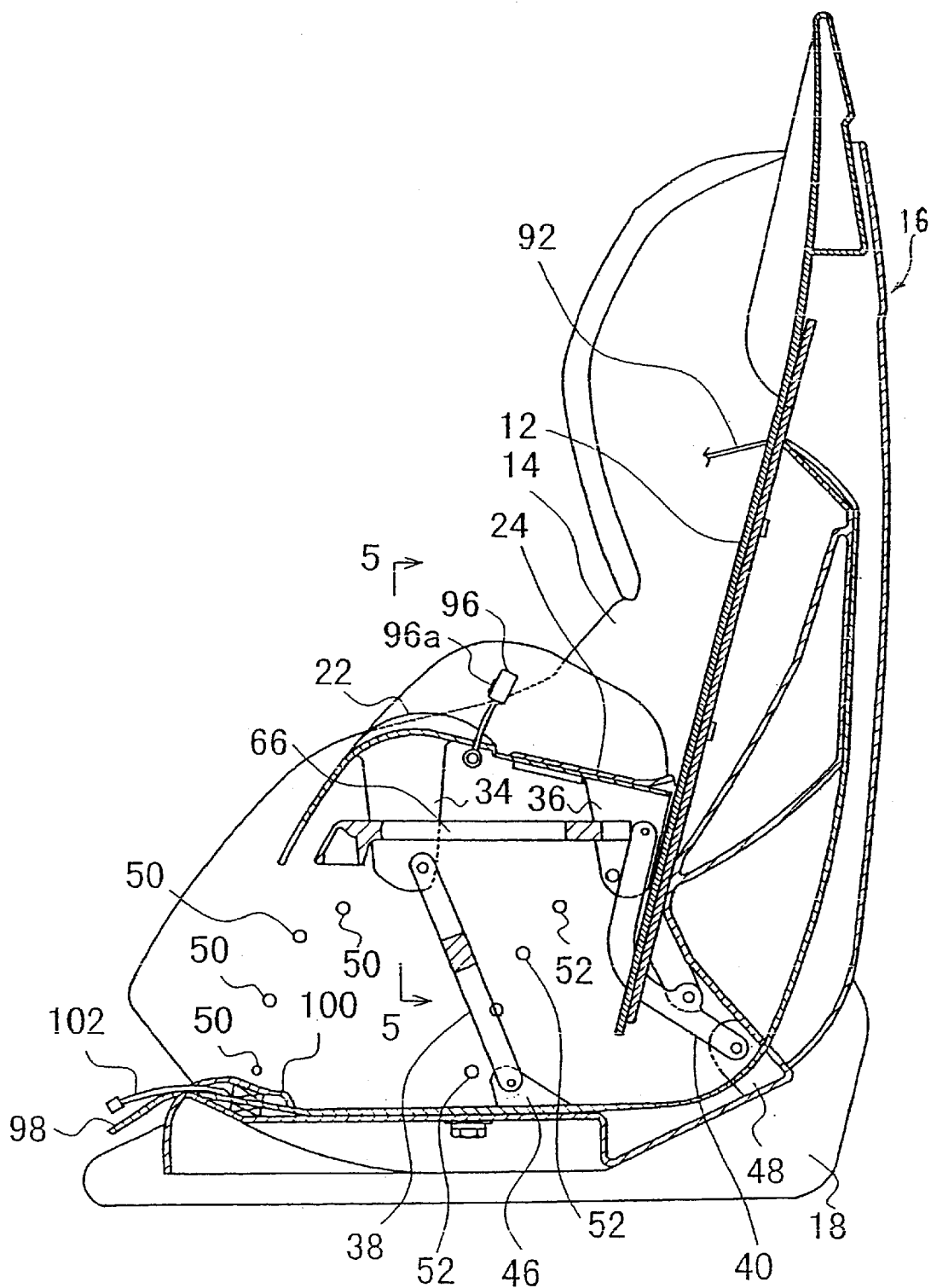
FIG. 3 is a sectional view of the child seat in a state that a seat plate is risen.

Hereinafter, a preferred embodiment of the present invention will be described with reference to FIGS. 1 through 8.

A child seat 10 comprises a seat body 16 having seat sides 14, a seat back 12 fixed to the seat body 16, a seat plate 20 supported by the seat body 16 in such a manner that the seat plate 20 can travel up and down, and a base 18 supporting the seat body 16. The seat plate 20 comprises a front seat plate 22 and a rear seat plate 24. The front edge portion of the rear seat plate 24 is slidably laid on the top surface of the rear edge portion of the front seat plate 22.

Figure 6:
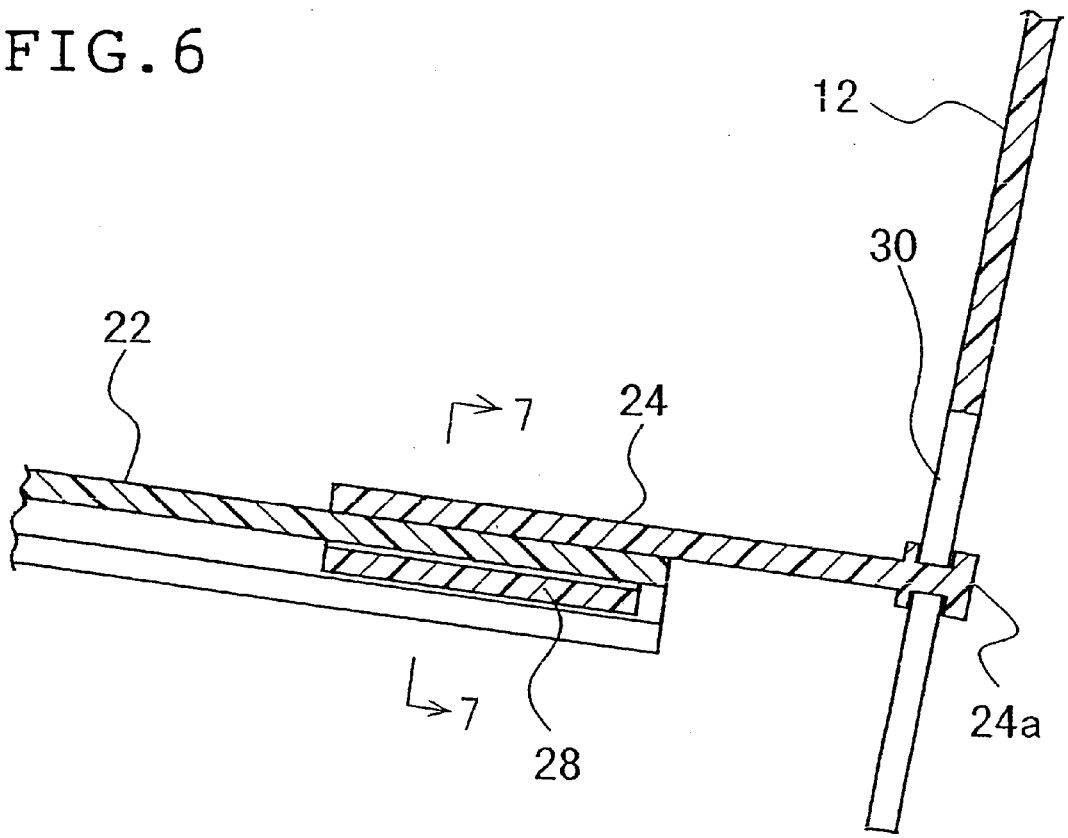
FIG. 6 is a sectional view taken along a line 6—6 of FIG. 1.
Figure 7:
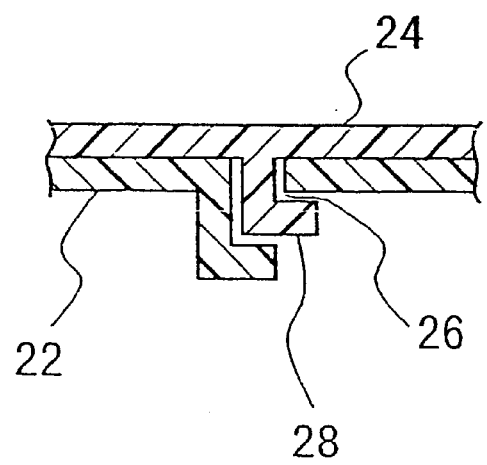
FIG. 7 is a sectional view taken along a line 7—7 of FIG. 6.

As shown in FIG. 6 and FIG. 7, the front seat plate 22 is provided with horizontal guide slits 26 extending in the longitudinal direction. The rear seat plate 24 is provided with projections 28 which are inserted into the horizontal guide slits 26 whereby the front seat plate 22 is slidably connected to the rear seat plate 24. In stead of this structure, the rear seat plate may be provided with horizontal guide slits and the seat plate may be provided with projections.

The seat back 12 is provided with vertical guide slits 30 extending upwardly from the lower end thereof. Rear end portions 24a of the rear seat plate 24 are slidably engaged with the vertical guide slits 30, respectively. Therefore, the rear seat plate 24 is allowed to move up and down with keeping the state that it is connected to the seat back 12.

Figure 4:
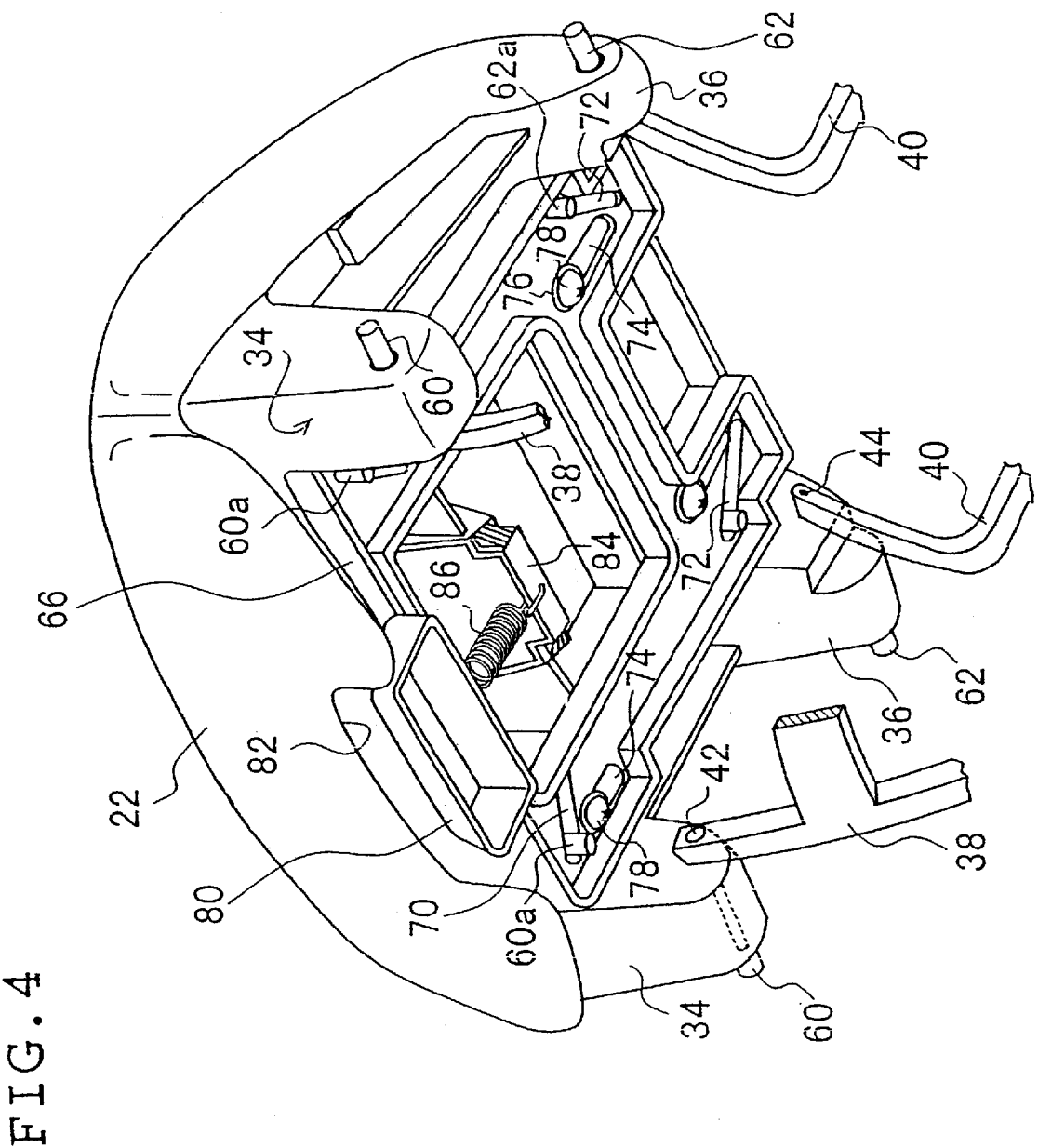
FIG. 4 is a perspective view of the seat plate and a slide frame taken from the underside.
Figure 5:
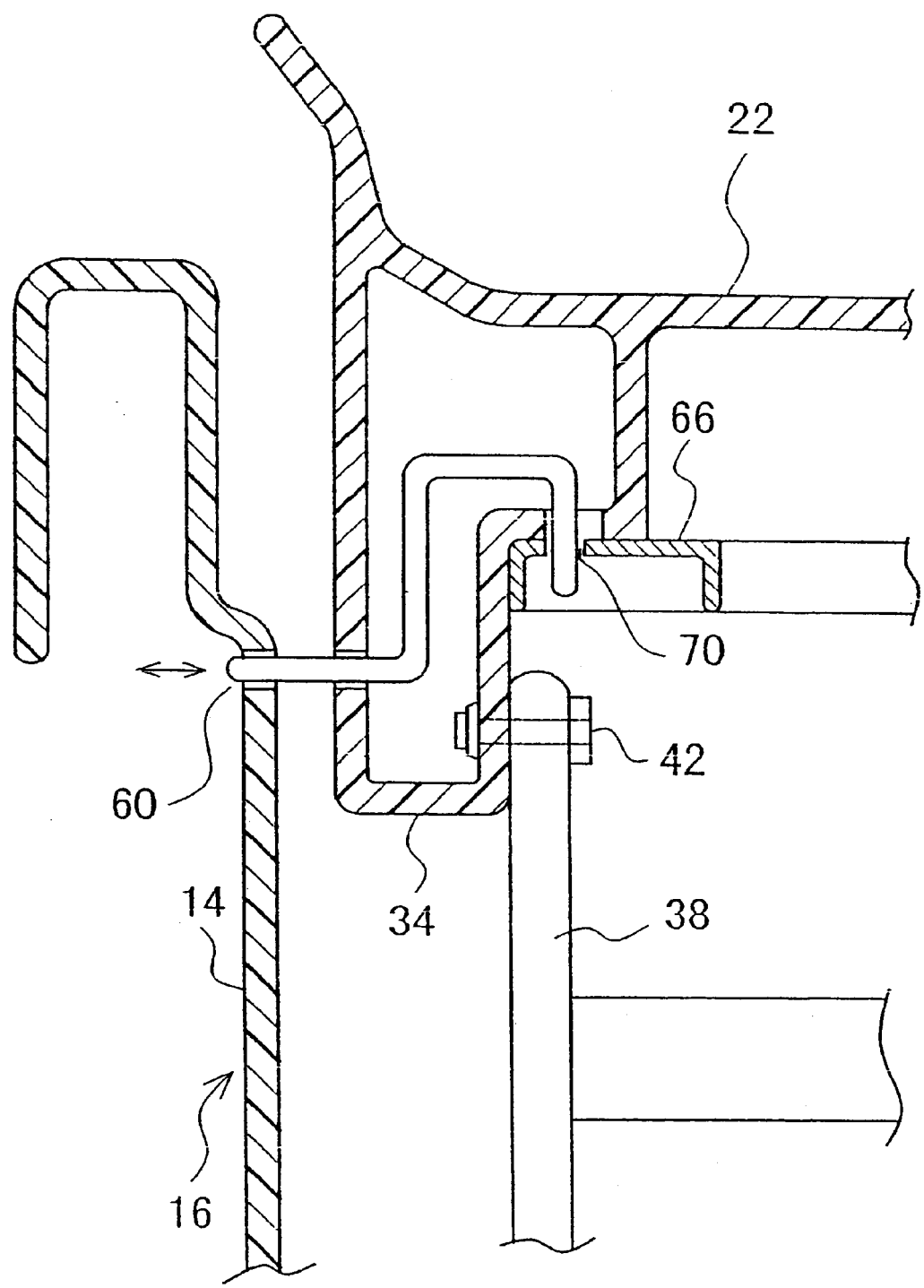
FIG. 5 is a sectional view taken along a line 5—5 of FIG. 3.

As shown in FIG. 4 and FIG. 5, the front seat plate 22 is provided with link connecting portions 34, 36 projecting downwardly from front-side and rear-side portions of the lower surface thereof, respectively. The respective upper ends of front links 38 and rear links 40 are pivotally connected to the link connecting portions 34, 36 by spindles 42, 44, respectively. The lower ends of the links 38, 40 are pivotally connected to link mounting members 46, 48 secured to the base 18, respectively.

The seat sides 14 composing the aforementioned seat body 16 are provided with insertion holes 50, 52 formed at various levels for receiving pins 60, 62. The pins 60, 62 to be inserted into the insertion holes 50, 52 are disposed to project from sides of the link connecting portions 34, 36.

As shown in FIGS. 4 and 5, rear ends 60a, 62a of the pins 60, 62 are inserted into guide slits 70, 72 which extend obliquely relative to the longitudinal direction of the child seat and which are formed in a slide frame 66 as a slide member.

The slide frame 66 has guide slits 74 extending in the longitudinal direction. Bolts 78 are inserted into the guide slits 74 via a slide washers 76 and are fixed to the link connecting portions 34, 36. Therefore, the slide frame 66 is attached to the front seat plate 22 in such a manner that the slide frame 66 can slide in the longitudinal direction of the child seat 10.

A handle 80 disposed at the front side of the slide frame 66 is positioned to face a notch 82 formed in a central portion of the front portion of the front seat plate 22.

A spring fixing member 84 is disposed to project from the lower surface of a central portion of the front seat plate 22.

Disposed between the rear-side portion of the handle 80 and the fixing member 84 is a tension coil spring 86 which always biases the slide frame 66 rearwardly (in a direction toward the seat back 12).

As the slide frame 66 is pulled by gripping the handle 80, the rear ends 60a, 62a are guided by the obliquely extending guide slits 70, 72 so that the pins 60, 62 come off the insertion holes 50, 52. Accordingly, the seat plate 20 is allowed to move up and down. As the handle 80 is released, the slide frame 66 is pulled by the spring 86 to retreat and the pins 60, 62 are guided by the guide slits 70, 72 to project and thus enter into the insertion holes 50, 52.

The two shoulder belts 92 are extended to the front side of the child seat just like passing over the seat back 12. Tongues 94 are attached to the shoulder belts 92, respectively and are capable of latching a buckle 96 disposed on the front seat plate 22. Numeral 96a of FIG. 2 and FIG. 3 designates a press button for releasing the tongues 94 from the buckle 96.

The rear ends of the shoulder belts 92 are connected to a tension belt 98 which is extended to the front side of the child seat through a space under the seat back 12 and the seat plate 20 and through a belt locking mechanism 100. The belt locking mechanism 100 has a locking function which allows the free passage of the tension belt 98 when pulled forwardly but locks the passage of the tension belt 98 when pulled rearwardly. In order to release this locking function, a lock release belt 102 is provided. As the lock release belt 102 is pulled, the tension belt 98 is allowed to move rightward of FIG. 2 and FIG. 3.

The seat back 12, the seat sides 14, and the seat plate 20 are covered by suitable soft covers (child seat cover), but not shown.

To adjust the height of the seat plate 20 in the child seat as structured above, the handle 80 of the slide frame 66 is pulled to cause the pins 60, 62 to come off the insertion holes 50, 52 and the seat plate 20 is moved up or down as described above. As the handle 80 is released, the slide frame 66 retreats by the force of the spring 86 and the pins 60, 62 project. Then, by slightly adjusting the seat plate 20 up and down, the end portions of the pins 60, 62 enter into some of the insertion holes 50, 52 which are positioned thereabout so as to stop and fix the seat plate 20 at a desired position.

After the seat plate 20 is set at the desired height the infant is seated on the seat plate 20 and then the tongues 94 are inserted into the buckle 96. Then, the tension belt 98 is pulled to secure the infant's body to the child seat.

In this embodiment, since the rear end of the rear seat plate 24 is always connected to the seat back 12 as mentioned above, a large space is never formed between the seat plate 20 and the seat back 12 even when the seat plate 20 moves up and down and the front seat plate 22 moves forward or backward in accordance with the movement of the seat plate 20. In addition, since the rear seat plate 24 and the front seat plate 22 are laid on each other, no space is formed therebetween. Since the front surface of the seat back 12 is flat, the child seat cover is never caught between the rear seat plate 24 and the seat back 12 even when the seat plate 20 is risen, so that the seat plate 20 can be always smoothly risen.

In this embodiment, since the slide frame 66 is biased rearwardly by the spring 86, the pins 60, 62 do not retreat unless the slide frame 66 is pulled forwardly by the handle 80. Therefore, the strength for stopping and fixing the seat plate 20 to the seat sides 14 is extremely high. The adjustment for the height of the seat plate 20 is quite simple just by pulling the handle 80 as mentioned above.

Figure 8:
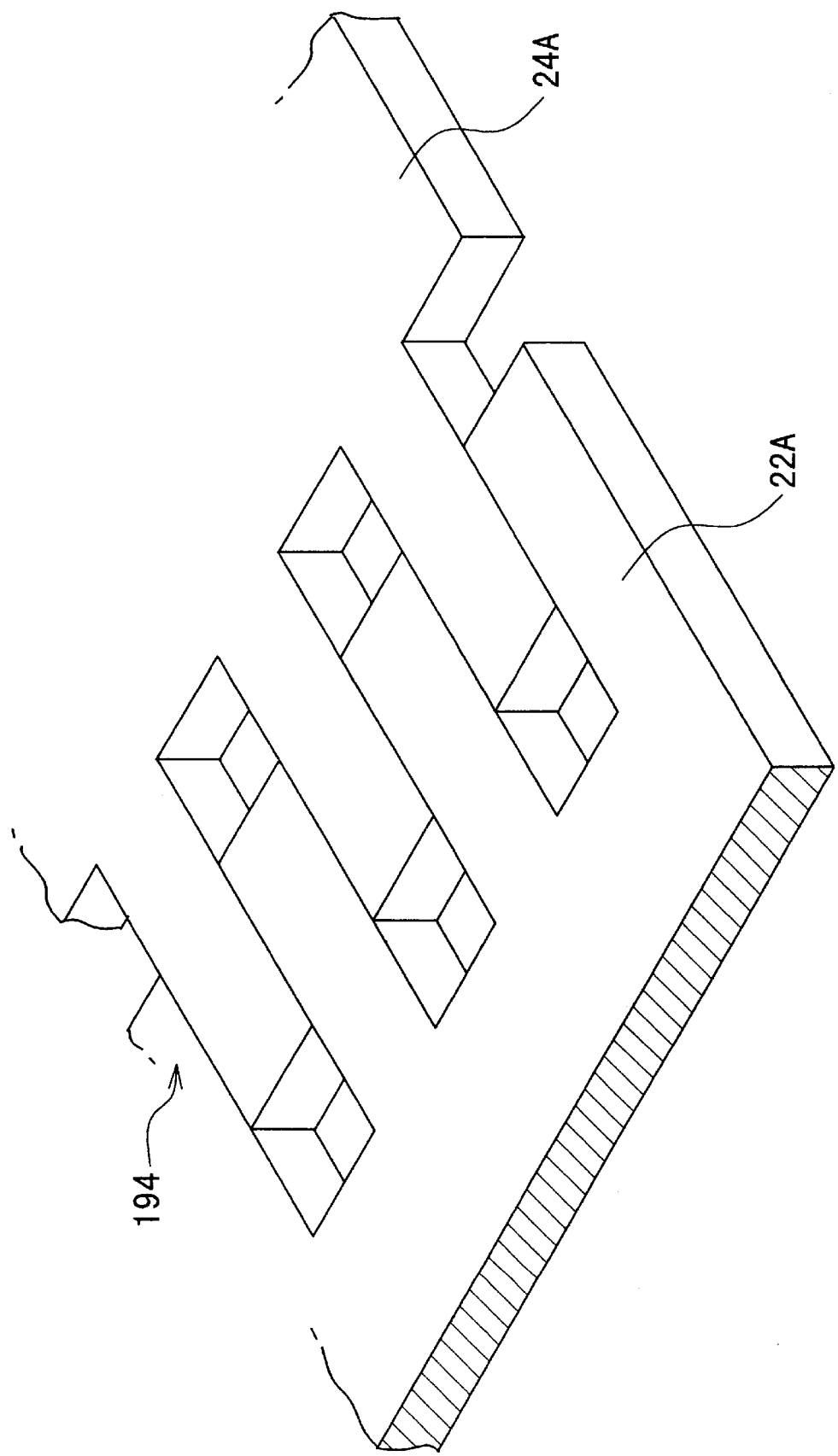
FIG. 8 is a perspective view showing another configuration of the seat plate.

Though the rear seat plate 24 is laid on the front seat plate 22 in the above embodiment, conversely the front seat plate 22 may be laid on the rear seat plate 24. As shown in FIG. 8, the rear portion of the front seat plate 22A and the front portion of the rear seat plate 24A may be provided with comb-like portions, respectively, so that the comb-like portions can be meshed with each other to form the upper surfaces of the seat plates 22A, 24A to be flat.

As described above, the child seat of the present invention can provide excellent comfort to an infant siting on the seat plate because the space between the seat plate and the seat back never widen even when the seat plate is moved up and down. The seat plate can be always smoothly moved up and down.

What is claimed is:

1. A child seat comprising:
 a base;
 a seat body attached to the base and having a seat back and a guide slit formed in the seat back;
 a seat plate formed of a front seat plate having first engaging means, and a rear seat plate having a rear end slidably engaging the guide slit in the seat back and second engaging means slidably engaging the first engaging means;
 a supporting mechanism including a linkage situated between the base and the front seat plate to allow the front seat plate, to which the rear seat plate is slidably attached, to move up and down; and
 stopping means attached to the front seat plate, said stopping means engaging the seat body to stop the front seat plate at a selected level relative to the base.

2. A child seat according to claim 1, wherein said seat body further includes seat sides having a plurality of holes in different vertical levels relative to the base, and said stopping means includes a plurality of projections selectively engaging the holes in the seat sides.

3. A child seat according to claim 2, wherein said stopping means further includes a mechanism to withdraw the projections inside the front seat plate so that when the mechanism is actuated, the projections are withdrawn from the holes to thereby adjust a seat position.

4. A child seat according to claim 1, wherein said supporting mechanism includes a plurality of links to support the front and back seat plates vertically.

5. A child seat according to claim 1, wherein said front and back seat plates are overlapped with each other, one of the first and second engaging means having at least one projection, and the other of the first and second engaging means having at least one slit engaging the at least one projection.

6. A child seat according to claim 1, wherein said first and second engaging means include a plurality of projections and slits between the projections, said projection of the first engaging means being situated in the slits of the second engaging means while said projections of the second engaging means are situated in the slits of the first engaging means.

\* \* \* \* \*